United States Patent [19]

Palmovist

[11] 4,225,272
[45] Sep. 30, 1980

[54] APPARATUS FOR CONTROLLING THE ACTIVATION AND DE-ACTIVATION OF A VACUUM ASSEMBLY CONNECTED TO A CONDUIT SYSTEM

[76] Inventor: Kaj Palmovist, Björkbogatan 18 A, S-212 32 Malmö, Sweden

[21] Appl. No.: 10,247

[22] Filed: Feb. 8, 1979

[30] Foreign Application Priority Data

Feb. 22, 1978 [SE] Sweden ................................ 7802056

[51] Int. Cl.³ ............................................ B65G 53/66
[52] U.S. Cl. ........................................ 406/15; 15/314;
    406/26; 406/117
[58] Field of Search ........................ 406/12, 14, 15, 16,
    406/17, 26, 117; 15/301, 314

[56] References Cited

U.S. PATENT DOCUMENTS

| | | | |
|---|---|---|---|
| 1,106,231 | 8/1914 | Marshall | 15/314 |
| 1,618,667 | 2/1927 | Melcher | 15/314 X |
| 2,914,789 | 12/1959 | Scanlan et al. | 15/314 |
| 3,048,875 | 8/1962 | Bottinelli et al. | 15/301 |
| 3,382,524 | 5/1968 | Sandstrom | 15/314 |

Primary Examiner—Jeffrey V. Nase
Attorney, Agent, or Firm—B. P. Fishburne, Jr.

[57] ABSTRACT

An apparatus for controlling the activation and deactivation of a vacuum assembly which is connected to a conduit system such as a suction conveyance system or a central cleaning system for maintaining a partial vacuum in the conduit system which has suction sockets which may be opened for coupling in vacuum-driven appliances and which are preferably self-closing when the vacuum-driven assemblies are disconnected is provided with a first sensing device and a second sensing device. The first sensing device is operative to sense that state in which all of the suction sockets are closed, in order to emit a stop signal to the vacuum assembly. The second sensing device is operative to sense the opening of one or more suction sockets, in order to emit a start signal to the vacuum assembly.

2 Claims, 1 Drawing Figure

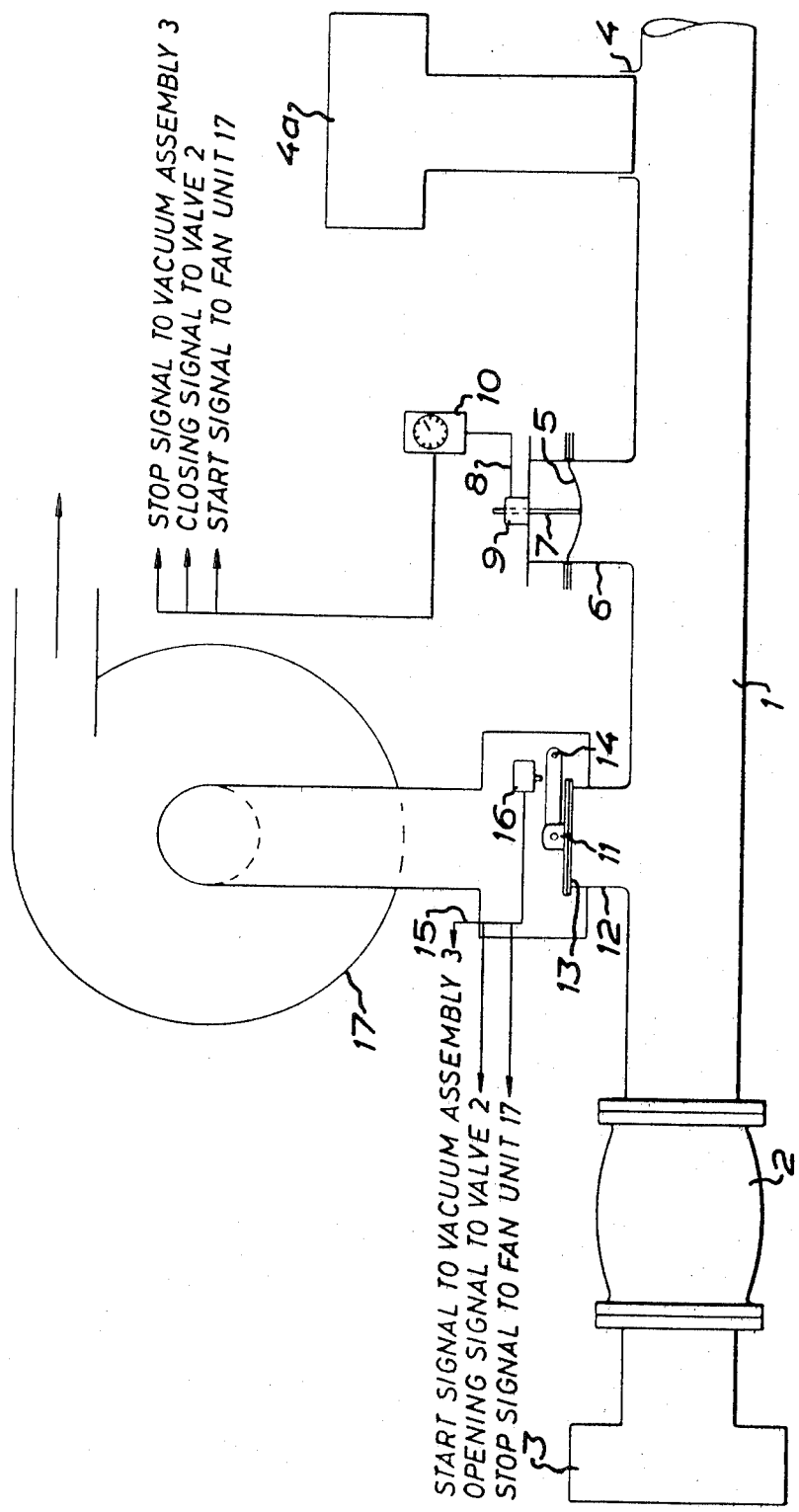

APPARATUS FOR CONTROLLING THE ACTIVATION AND DE-ACTIVATION OF A VACUUM ASSEMBLY CONNECTED TO A CONDUIT SYSTEM

The present invention relates to an apparatus for controlling the activation and de-activation of a vacuum assembly which is connected to a conduit system such as a suction-conveyance system or a central cleaning system, in order to maintain a partial vacuum in the conduit system which has suction sockets which may be opened for the coupling-in vacuum-driven appliances and which are preferably self-closing when the vacuum-driven appliances are disconnected.

Conduit systems which form, for example, part of a central cleaning system have, as a rule, self-closing suction sockets for the coupling-in of vacuum-driven appliances, for example cleaners. When all of the suction sockets are closed, that is to say when no vacuum-driven appliance is coupled into the conduit system, a vacuum assembly connected to the conduit system maintains a partial vacuum in the conduit system which is more powerful than the partial vacuum which the vacuum assembly maintains in the conduit system when one or more suction sockets are open, that is to say when one or more vacuum driven appliances are connected into the conduit system. Under such circumstances, the power consumption of the vacuum assembly is greater when the conduit system is not being used for its contemplated purpose, such as cleaning, than when the conduit system is in use, that is to say when, for example, the cleaners are connected into the conduit system. In conduit systems in which the vacuum assembly must be manually shut off when the conduit system is not in use, experience has shown that considerable negligence occurs in the shut-off operation, which may result in the vacuum assembly's running quite unnecessarily for long periods with great power consumption.

The major aspect of the present invention is, therefore, to realize an apparatus of the type disclosed by way of introduction which automatically de-activates the vacuum assembly when all of the suction sockets are closed.

To this end, the apparatus described by way of introduction is provided with a first sensing means operative to sense that state in which all suction sockets are closed in order to emit a stop signal to the vacuum assembly, and a second sensing means operative to sense the opening of one or more suction sockets, in order to emit a start signal to the vacuum assembly.

The nature of the present invention and its aspects will be more readily understood from the following brief description of the accompanying drawing, and discussion relating thereto.

In the accompanying drawing there is shown schematically a section of a conduit system provided with an apparatus according to the present invention.

The reader is now referred to the drawing on which is shown a conduit system 1 consisting of a series of conduits in communication with each other and connected, via a valve 2, to a vacuum assembly 3 which is operative to establish a partial vacuum in the conduit system 1 whenever necessary. The conduit system 1 has a plurality of suction sockets 4 (of which only one is shown on the drawing) which may be opened (in a manner which is not shown in greater detail) for the coupling-in of vacuum-driven appliances 4a and are self-closing when these appliances are disconnected.

A diaphragm 5 is inserted in a pipe stub 6 in communication with the conduit system 1, the purpose of the diaphragm being to sense the difference between the pressure in the conduit system 1 and a reference pressure, for example atmospheric. The diaphragm 5 is connected by means of a rod 7 to a switch 9 disposed in an electric circuit 8 which is shown only in part. A time relay 10 is also provided in the electric circuit 8 for reasons which will be disclosed below.

A flap valve 11 is disposed at the upper end of a pipe stub 12 in communication with the conduit system 1. The flap 13 of the flap valve 11 is pivotal on a shaft 14 between a closed position covering the pipe stub 12 and an open position in which it cooperates, in a manner described in greater detail below, with a switch 16 disposed in an electric circuit 15 which is shown only in part. A fan unit 17 is connected above the pipe stub 12.

When the vacuum assembly 3 is in operation, the valve 2 is open and at least one vacuum-driven appliance 4a is connected into the conduit system 1, in other words at least one suction socket 4 is open, the vacuum assembly 3 maintains a certain partial vacuum in the conduit system 1, the flap valve 11 sealingly abutting against the upper end of the pipe stub 12 as a result of this partial vacuum. When no vacuum-driven appliance 4a is connected into the conduit system 1, that is to say when all suction sockets are closed, the partial vacuum in the conduit system 1 will become more powerful and the diaphragm 5 will be drawn downwardly. In such an instance, the diaphragm 5 will, via the rod 7, act upon the switch 9 in such a manner that a stop signal is emitted to the vacuum assembly 3, a closing signal is emitted to the valve 2 and a start signal is emitted to the fan unit 17. However, there is a time lag between triggering and emitting of the stop signal emitted to the vacuum assembly 3, the closing signal emitted to the valve 2 and the start signal emitted to the fan unit 17, this pre-determined time lag being governed by the time relay 10. The reason for this time lag is that these signals should not be emitted in the event of a brief closure of all of the suction sockets 4. The vacuum assembly 3 having been shut off, the partial vacuum in the conduit system 1 is weakened somewhat as a result of the leakage which normally occurs in conduit systems of this type. The fan unit 17 is now in communication with the conduit system 1, despite the fact that the flap valve 11 is "closed", since this valve, as a result of the reduction of the pressure difference there across, lightly rests against the upper end of the pipe stub 12 and effects a flapping movement. Under these conditions, the fan unit 17 maintains a certain partial vacuum in the conduit system 1.

When one or more suction sockets 4 are now opened, an air flow passes from this or these suction sockets 4 towards the fan unit 17 and opens the flap valve 11 which then acts upon the switch 16 in such a manner that a start signal is emitted to the vacuum assembly 3, an opening signal to the valve 2 and a stop signal to the fan unit 17.

Thus, the apparatus according to the present invention realizes automatic shut off of the vacuum assembly 3 and automatic start of the fan unit 17 when all of the suction sockets 4 are closed. A considerably lower power consumption is required for running the fan unit 17 than for running the vacuum assembly 3 under that state when all suction sockets 4 are closed.

As was mentioned above, the power consumption of the vacuum assembly 3 is greater when all of the suction sockets 4 are closed than when at least one of them is open. This may also be utilized for realizing the above-mentioned control. Hence, the diaphragm 5 may be replaced by an ammeter which is operative to measure the current supplied to the vacuum assembly 3 in order to indicate whether all of the suction sockets are closed or not, since this current, thus, increases when all of the suction sockets 4 are closed.

What I claim and desire to secure by Letters Patent is:

1. An apparatus for controlling the activation and de-activation of a vacuum assembly (3) which is connected to a conduit system (1), such as a suction conveyance system for a central cleaning system, in order to maintain a partial vacuum in the conduit system, said system being provided with suction sockets (4) which may be opened for coupling in vacuum-driven appliances (4a) and which are self-closing when said vacuum-driven appliances are disconnected, comprising a first sensing means (5, 7, 8, 9) operative to sense that state in which all of said suction sockets (4) are closed, in order to emit a stop signal to the vacuum assembly (3), and a second sensing means (11, 15, 16, 17) operative to sense the opening of one or more suction sockets (4) in order to emit a start signal to said vacuum assembly (3), said second sensing means (11, 15, 16, 17) including a fan unit (17) which is disposed to receive, as its start signal, the stop signal emitted to said vacuum assembly (3) in order, when said vacuum assembly (3) is closed, to maintain a certain partial vacuum in said conduit system (1), and an air-flow sensing device (11) which is operative to sense the air flow in said conduit system (1), which occurs when one or more suction sockets (4) in said conduit system (1) are opened, in order to actuate a switch (16) disposed in an electric circuit (15) in such a manner that a start signal is emitted to said vacuum assembly (3), said fan unit (17) being disposed to receive, as its stop signal, the start signal emitted to said vacuum assembly (3).

2. The apparatus as defined in claim 1, wherein said air-flow sensing device is a flap valve (11) which is disposed in a connection pipe (12) between said fan unit (17) and said conduit system (1).

* * * * *